United States Patent [19]

Donald et al.

[11] Patent Number: 4,471,163

[45] Date of Patent: Sep. 11, 1984

[54] SOFTWARE PROTECTION SYSTEM

[76] Inventors: Thomas C. Donald, 2651 Rillwood Rd., Birmingham, Ala. 35243; Henry W. Donald, 428 Lakewood Dr., Homewood, Ala. 35209

[21] Appl. No.: 308,248

[22] Filed: Oct. 5, 1981

[51] Int. Cl.³ .............................................. H04L 9/00
[52] U.S. Cl. ............................ 178/22.08; 178/22.19; 364/200
[58] Field of Search ................. 178/22.08, 22.19; 340/825.34; 364/200, 900

[56] References Cited

U.S. PATENT DOCUMENTS

| | | | |
|---|---|---|---|
| 3,566,362 | 2/1971 | Taylor | 364/200 |
| 3,996,449 | 12/1976 | Attanasio et al. | 340/825.34 |
| 4,120,030 | 10/1978 | Johnston | 364/200 |
| 4,278,837 | 7/1981 | Best | 178/22.09 |
| 4,309,289 | 12/1981 | Lumley | 364/200 |

OTHER PUBLICATIONS

IBM Tech Disclosure Bulletin, vol. 21, No. 2, (7/78), pp. 836–837, Gurugé.

Primary Examiner—Sal Cangialosi
Attorney, Agent, or Firm—C. A. Phillips

[57] ABSTRACT

A protection system for controlling the operation of a digital computer as to a particular program wherein a program "lock" interfaces with the computer and authorizes the operation in response only to a selected relation between a number in the program, a number in the lock, and a third number, a "key", supplied to the lock and which bears a selected relation to both the program number and lock number.

9 Claims, 3 Drawing Figures

SOFTWARE PROTECTION SYSTEM

FIELD OF INVENTION

This invention relates to devices and systems for preventing a digital computer from executing a program unless means auxiliary to the computer authorize it.

BACKGROUND OF INVENTION

The applicant has found, from a study of the field, basically three suggested mechanisms for the protection of software products against non-licensed use. The first one is simply a contract between the software producer and user wherein misuse creates rights for the recovery of damages or specific penalties for misuse. A second one is the display of the licensee's name or other unique information on a CRT screen or printout which publicizes the terms of the license and to some extent provides a deterent against use by other than a licensee. The third one is applicable to cases where a program is to be run on a computer into which is incorporated an identification number. Thus, a software manufacturer may incorporate into its software product instructions that the product can only be employed with a computer bearing that identification number.

While the first two measures offer some protection against the illegal resale of software products, they generally do not prevent the sharing of licensed products among closedly related users. Furthermore, with respect to the first one, it may not be effective at all in countries where procedural or substantive law prevents the enforcement of a particular contract (even in this country, little known enforcement has been evidenced).

The second and third approach suffer from the requirement that software distribution must be customized for each buyer, and while this may seem simple, it has proved to be logistically difficult in practice.

The third approach is perhaps the most effective one, and for computers which can read out identification numbers, it can be implemented in a standardized fashion. However, most computers do not contain built-in identifications which can be read by a program. In such cases, special purpose identification devices must be supplied. Unfortunately, there are no standards for such devices, and the use of a different identification device for each product is unwieldy and generally leads to incompatibility when more than one such product is to be used on the same computer. Also, simple hardware identification readouts are easy to defeat.

Accordingly, it is the object of the invention to: (1) provide a software protection system which effectively guarantees that a given software product cannot be used on an unauthorized computer, (2) be both convenient and simple to use with any computer system, and (3) be compatible with usage by a computer of other software products, which may either be adapted to be protected by the system, or may not be. In other words, no limitations are placed upon a computer by virtue of the employment of the present system.

SUMMARY OF THE INVENTION

This invention contemplates a digitally encoded program or process which is electronically stored or storable in a memory associated with a computer or process controller such as might control a proprietary industrial process. As a matter of convenience of description, the present system will be described in terms of the control of a computer, but it is to be appreciated that both type devices are intended by such reference.

The signal makeup of the program or process stored, or to be stored, is modified by the inclusion in it of procedures V to generate certain signals V', which, by themselve, inherently interfere with the normal performance, "running", of the program (or process) by the computer (or process controller) and call for an external authorization to eliminate the interference.

Separate from the computer, a "lock mechanism, equipped with a unique identifying number C, (which defines signals C') is employed, and it is uniquely equipped to facilitate the requests for and the provision of "run" authorizations. Further, a set of "key" signals K', representing a number K derived at least in part from bases common to signals V' and C', are supplied to a memory accessible to the lock. As a first function, the lock obtains the key signals K' and makes a comparison of them in terms of the lock identity number C, and if signals K' bear a selected correlation to signals C', at least a portion of the information in signals K' are caused to be stored in a memory in the lock. These stored signals are thus made available as, in effect, signals for the processing of subsequent "run" authorization requests from the computer, which are in the form of signals V' as described above.

When a "run" authorization request is generated, the lock causes a correlation process to occur involving elements of signals V' and K', and when the selected correlation is present, the "running" of the stored program or process involved is enabled. In the absence of the selected correlation between signals, V' and K', the stored program or process will not be authorized to "run".

As an added feature of this invention, the key signals K' would include signals representative of a selected time period, A to B, during which the signals K' would be effective, and the lock would include a current time generator for the generation of a current time signal T''. A comparison would be made by the lock between the authorization period signals, A' and B', and current time signals, T'', and thus, limit the time during which the lock could enable "running" to the time period indicated by the time expressed in signals K'.

A minor modification of this software protection system would be a system in which many locks were assigned the same identity code C, and in which the keys K were distributed in a form which was difficult to reproduce (such as a magnetically encoded card). This "special case" implementation of the invention would not provide as high a level of security, but its simpler logistics might be desirable in certain applications.

It is to be appreciated that the alphabetical designation of signals and symbols used herein is employed only for convenience of description.

DETAILED DESCRIPTION OF THE DRAWINGS

Figure 1:
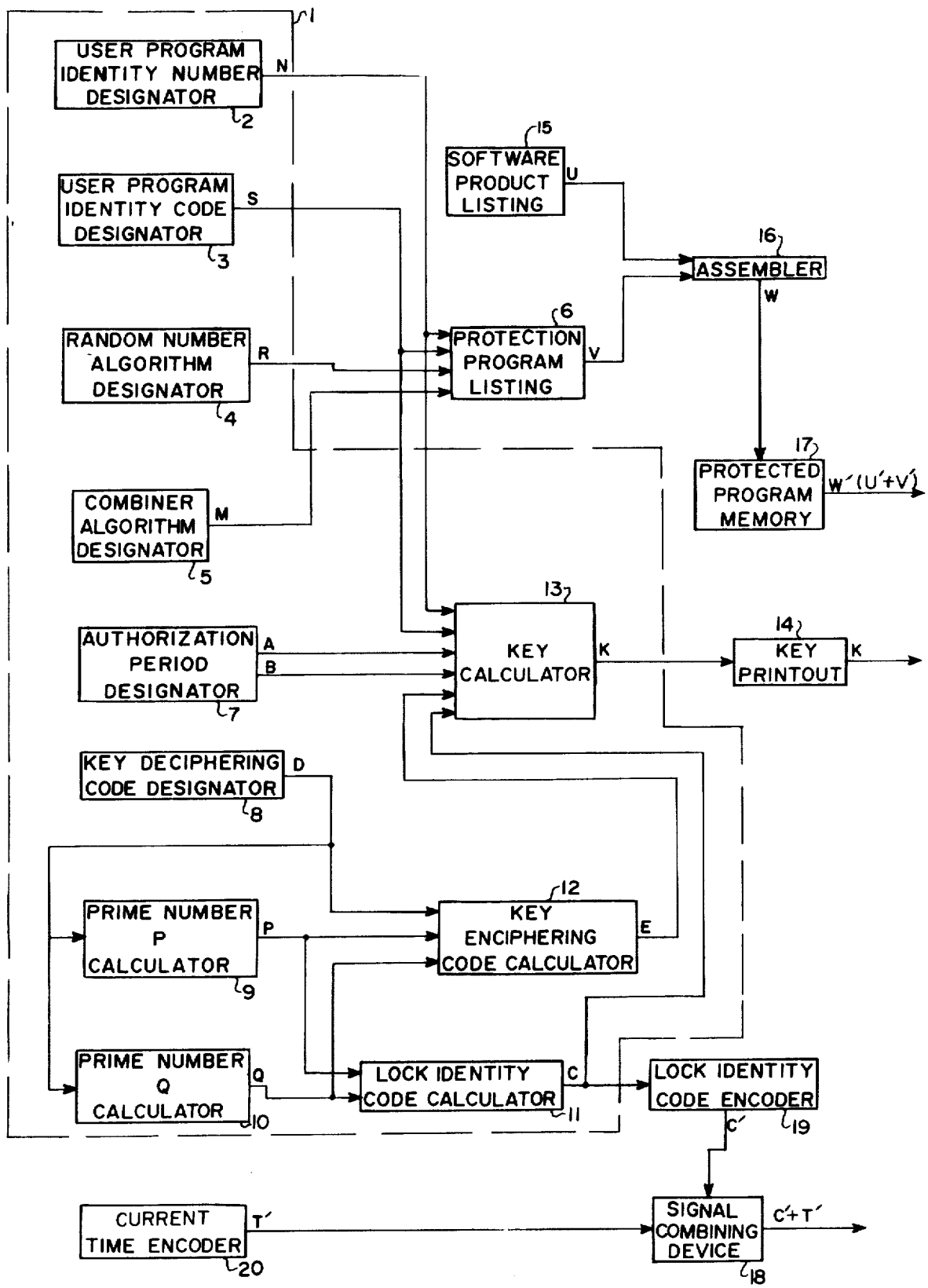
FIG. 1 is a schematic illustration of a portion of the system of this invention wherein the protected program, key, and lock identity are developed.

Referring to FIG. 1, the collection of elements labeled (1) is illustrative of means for the generating of discrete data sets of terms identified as N, S, R, M, A, B, D, P, Q, C, E and K, which are employed in the operation of the system of this invention. Depending upon the complexity of the data set, as will be further explained, the generators may vary from what amounts to essentially no calculations, that is, the simple choice of a number, to the determination of plurality of data sets indicative of instructions for the performance of a selected algorithm by a general purpose computer or other form of programmable computational device. While, as an aid to an appreciation of the different data sets, individual generation elements are shown in FIG. 1, it is to be appreciated that the function of all may be discretely performed by a single general purpose computer. As shown, the data set or terms are produced by one of the generating elements as follows:

User program identity number designator 2 generates a number N which is a three-byte, randomly chosen, non-secret number destined for a particular software protection program V, a part of a computer program to be supplied to a software owner for incorporation into a particular software product U, producing a protected program W. When incorporated, N is used as an address for a content-addressable memory 35 in the lock 22 of FIG. 2, as will be further discussed.

User program identity code designator 3 generates an identity code S, being a 24-byte number, randomly chosen. It is utilized in two forms, in the protection program V and in a software key K separately provided the software owner for use with the protected program W. The number S is kept secret from all but the owner of the program U to which it is to be applied. It and its processing play a vital part in the security aspects of this invention.

Random number algorithm designator 4 generates a series of program instructions R for the performance by a digital computer of a selected algorithm for the computation and generation of signal X', representative of an eight-byte random number X. A typical example of this algorithm R would be one which would instruct a computer to determine X' from any data continuously varying in the computer, such as time of day in fractions of a second. This random number is used with secret number S to enhance security of the system. Signal R is embodied in protection program V.

Combiner algorithm designator 5 generates a term M which comprises a series of computer program instructions for the performance of a second algorithm, as an example, the instructions would be: (1) Separate the term S into three 8-byte quantities: SA, SB, and SC, (2) For each bit which is set in X, the corresponding bit in SA is complemented to provide Y, (3) The 8-byte result is multiplied by SB to provide Z, (4) The 16-byte product of step 3 is divided by SC yielding an 8-byte remainder of which the fifth, sixth, and seventh bytes are taken as an answer. In this example, it is to be seen how terms S and X are herein related. Actually, any mathematical computation in which it would be difficult to deduce from the answer the components being combined would be sufficient for M.

Term M is combined with terms N, S, and R to complete the protection program V, and these terms as combined form the protection program listing 6. A logically identical signal M" is independently generated by combiner algorithm designator or generator 33 in program lock 22 of FIG. 2.

Authorization period designator 7 is simply an encoder which would provide a digital output designating by a term A the first date on which it is permissible to run the program to be protected by the protection program V of listing 6 and designating by a term B the last day on which it would be permissible to run the same program. Each of these terms, A and B, are expressed as three-byte quantities, the first byte representing a day, the second byte representing a month, and the third byte representing a year.

Key deciphering code designator 8 is simply an encoder which provides as an output a digital representation D of any selected odd number. This term, which appears in software key K, is also replicated as signal D' by a like key deciphering code designator 32 in program lock 22.

Prime number calculators 9 and 10 calculate, respectively, prime numbers P and Q, each being different numbers 16-bytes long (with the most significant byte non-zero), and each must be chosen so that the prime number minus one is relatively prime to key deciphering code term D.

Lock identity code calculator 11 receives the outputs P and Q from prime number calculators 9 and 10 and multiplies the first prime number P by the second prime number Q to produce a 32-byte product C, which is effectively a secret identity code which is assigned to a particular program lock 22.

Key enciphering code calculator 12 is responsive to the terms D, P, and Q and functions to calculate a number E such that when E is multiplied by D and subsequently divided by the product $(P-1)(Q-1)$, the remainder is 1. E is thus the modular inverse of D with respect to the product $(P-1)(Q-1)$, and there are well known mathematical procedures for its computation.

Key calculator 13, responsive to key enciphering code E and lock identity code C, enciphers the terms N, S, A and B to produce a program authorization key K as follows: The bytes of information comprising N, S, A, and B are separated into two groups, each of which is padded with random bytes so that each group is 30 bytes long. For example, a first group may be formed of 24 bytes of S plus six random bytes, and the second group of N, A, and B padded with 21 random bytes. Each group is enciphered separately so that the key K actually comprises two sets of information. The enciphering process effectively multiplies the 30-byte quantity of each by itself as many times as the value of key enciphering code E, and then divides the result by C, and finally takes the 32-byte remainder of the division process as the result of each enciphering procedure. The two 32-byte sets of information are concatenated (placed serially) to form key K. The procedure followed in these calculations is actually implemented by modular multiplication instead of ordinary arithmetic.

The protection listing 6 is given to the software owner. The software owner would then combine the protection program V with a particular software product U illustrated as software product listing 15. The combination would be accomplished by a selected pattern of mixing of the owner's program with the protection program. As an example of such a pattern, the software owner may: (1) alter a critical program variable in his software product U by adding to it random number X, (2) transiently decipher an enciphered representation of S and, using X and algorithm M, calculate F, the number to be represented by signal F', (3) recover the critical program variable by subtracting from it random number X, (4) send N and X to the program lock 22 and receive its reply, to be represented by signal F", (5) make use of the critical variable transiently altered by combination with X, and (6) abort or cause the program to malfunction if signal F" does not equal signal F'. These discrete procedures would be spaced as far apart as possible in the execution of the program so as to make it difficult for someone to find and modify the procedures.

The resultant program, now a protected program, would then be processed by an assembler 16 to translate it to its binary representation which would then be recorded in a protected program memory 17 (e.g. some conventional magnetic media). As many copies as might be required by potential users of the software product could be made, only one of which is shown. This would typically be accomplished by a general purpose digital computer.

Upon completion of the recording step, the program owner would then furnish a copy of program memory 17, now comprising the protected program W, to a purchaser of his program. A key printout 14 would also have to be provided to that purchaser, but this could be done by any party privy to the various information described in FIG. 1, typically an agency specializing in that service. Alternately, instead of the key being in printed form, it may be in a more secure form, as, for example, in the form of a magnetic recording, either in plain form or in an encoded form. For example, the recording may comprise a small card having a magnetic memory therein.

Figure 2:
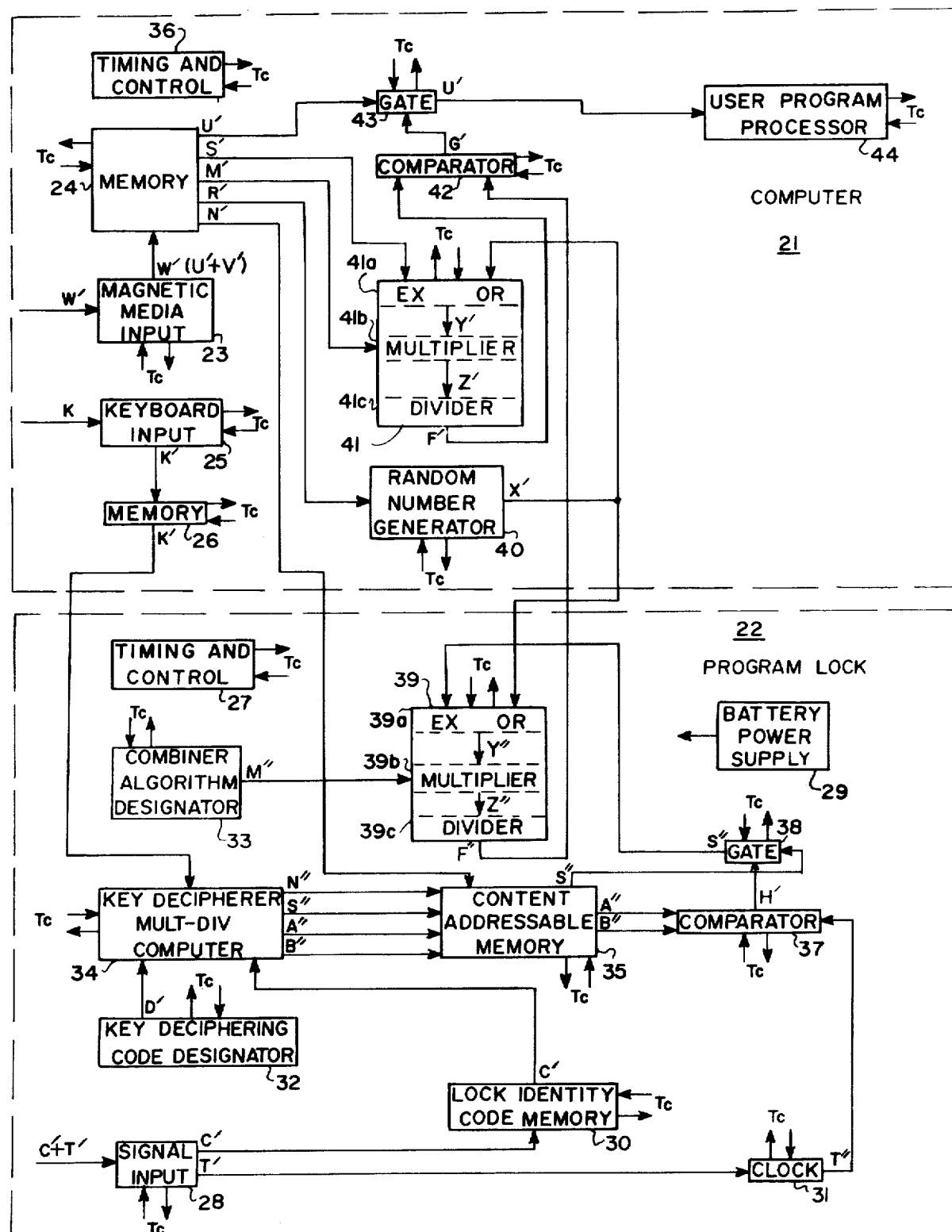
FIG. 2 is a block diagram illustrating the computer and also the lock mechanism which is a basic part of the system of the invention.

Prior to his purchase, the purchaser of a protected program W is informed that the program can only be run on a computer which has a program lock 22, shown in FIG. 2, connected to it. Accordingly, the software purchaser user would arrange (if such arrangement had not already been made) with a supplier of a program lock for the installation of such a program lock on the computer the program user intends to employ. It should be noted that the prime numbers P and Q used to generate the lock identity code C, incorporated into the lock acquired by the purchaser, must be known in order to generate the key K required for use of the protected program W by the particular user. Thus, the lock would typically be provided by the same agency specializing in the service of issuing keys, as mentioned above.

Assuming that this has been accomplished, the software user would then load his protected program W, from program memory 17, and the related key K, from key printout 14, into memory sections of his computer 21 as shown in FIG. 2. As protected program memory 17 is in magnetic media form as described, it would be loaded by means of a magnetic media input component 23 to the computer 21 into memory section 24 of the computer. Key K, where in source or plain language, would be entered via keyboard input 25 into memory section 26 of computer 21.

In the same manner described, other protected programs, and their discrete related program keys, configured within the constraints described above, may be loaded into the same computer and be discretely protected from unauthorized usage. A program and related key would be matched by a common program identity number N. Unprotected programs may also be loaded into and run on computer 21, as the present system does not interfere with their running.

As stated above, the program lock 22 is a necessary and vital element of the protection system of this invention. It functions to require that a computer attempting to run a protected program interact with it in a precise manner in order that the program perform in its advertised fashion. The program lock 22 comprises an electronic system depicted by the blocks illustrating it in FIG. 2. As is well known, electronic systems may often be instrumented by either discrete circuit elements wherein each performs a single function or may be instrumented by a single multipurpose device, such as a microprocessor, wherein all, or a substantial portion of, the required signal functions are performed by it. Typically, a microprocessor is constructed in a manner which enables it to rapidly switch from one functional configuration to another, and to thus serially, in time, perform the several assigned functions. Here, either approach may be used, and in referring to a functional element, such is contemplated. In either event, typically a timing and control circuit 27 is employed to route signals between electronic subsystems or units, and in the case of a microprocessor, the timing and control circuit would effect the configuration of the microprocessor to sequentially take the form of the electronic subsystems shown. Timing and control circuit 27 typically comprises a conventional clock driven logic circuit which controls program circuit interconnections and routing of signals during precise intervals. Its control function is illustrated by Tc labelled circuit interconnections between functional elements. An equivalent timing and control circuit 36 is shown for computer 21 and its output signal is also labelled Tc. Typically, however, the timing and control functions of the computer 21 would be distinct from those of the program lock 22.

In examining program lock 22, it is to be first noted that in addition to its particular circuit arrangement as illustrated in FIG. 2, it must be supplied certain references or reference signals. As shown in both FIGS. 1 and 2, signal combining device 18 is coupled to signal input 28 of program lock 22 for this purpose. The first of these references is a signal equivalent C' of term C. The second one is a signal T', representative of current time. Referring to FIG. 1, signal C' is generated by lock identity code encoder 19 responsive to a C input from lock identity code calculator 11. Alternately, the C' signal may be taken directly as a digital signal output of calculator 11, assuming that calculator 11 is an electronic calculator having a compatible signal output. The current time signal T' is obtained from a conventional clock signal encoder or current time encoder 20 which provides as an output a digitally encoded representation of Greenwich standard time. The signals C' and T' are combined, by parallel-to-serial converter or signal combining device 18, and as combined, are fed from converter 18 to signal input 28 (FIG. 2) of program lock 22.

Timing and control 27 (FIG. 2) controls signal input 28 to route signal C' to lock identity code memory 30 where it is permanently stored as a reference. Similarly, current time signal T' is routed to clock 31, a resettable clock with a digitally encoded output. The result is that clock 31 is set to current time. In this manner, the time of the request for the running of a program is always available as a reference. Both the lock identity code memory 30 and the clock 31 are, thus, set by the same operation which precludes the possibility of someone resetting the clock 31 without knowing (or inadvertantly destroying) the pre-existing lock identity code C.

In order to mantain the data stored in memory 30 and the correct time in clock 31, some circuitry of program lock 22 must be continuously powered, as is facilitated by self-contained, rechargeable, battery power supply 29, which supplies operating power to critical circuit elements of the program lock 22.

Program lock 22 provides by its circuitry two additional references. One of these is signal D', a signal representative of the same odd number as D, which is an element of the determination of K. Signal D' is generated by key enciphering code designator 32, which may simply be a digital encoder which provides as an output a digital signal representative of D. The final one is a digital group M", which is a digitally encoded signal group representative of the program algorithm or instructions M described above. This signal group is generated by combiner algorithm designator 33, which in one form may be a set of digitally encoded signals stored in a memory and which are read out pursuant to a demand from timing and control 27.

Signal C', now stored in memory 30, and signal D' are employed to decipher the contents of the signal K', representative of key K for a given program. There would be a signal K' stored in memory 26 of computer 21 for each protected program to be run by computer 21. Timing and control circuit 27 of program lock 22 would be operated to accept discrete signals K' and separately supply the same to key decipherer 34. The latter would, responsive to signals C' and D', decipher the key K' into its constituents N", S", A", and B", representative of the like lettered constituents of the term K as described above. Key decipherer 34 comprises a discrete computer or microprocessor which performs a multiplication function followed by a division function, the multiplication function being directed by D', and the division function directed by C', these functions being performed on the input signal K'. More specifically, each of the two parts of K are multiplied by itself as many times as the value represented by signal D', and each result is divided by the value represented by signal C'. The remainder of this process on the first part of K is representative of S as described above, and the remainder of the process on the second part of K is representative of terms N, A, and B. They take the related forms of signals S", N", A", and B", and a discrete set of these signals (for a given K') is stored in a discrete address in content-addressable memory 35, employing the signal N" for subsequent memory addressing.

In the manner described, sets of signal values for each key K of each protected program to be used in computer 21 are uniquely stored in program lock 22 for use when called upon to determine an authorization for the running a program.

A demand for the running of a selected program is effected by a prearranged selected keyboard entry which identifies the selected program. Such occurrence would typically be directed through timing and control circuit 36 of computer 21, which would then cause the N' term of the particular program requested to be applied to the interrogating input of memory 35 of program lock 22. When this occurs, the S", A", and B" signals for the program key for that program are read out of memory 35.

The S" term is used if, and only if, the present time, as represented by signal T" from clock 31, is within the permissible time frame between the times indicated by time signals A" and B". Time comparison is made by comparator 37. Typically, comparator 37 would be a digital comparator which simply compares digitally encoded signal T" with digitally encoded time values A" and B". It provides an enabling output signal H' to gate 38 when the value of signal T" is between the values of signals A" and B". Comparator 37, like other active elements of program lock 21, may be instrumented by a discrete electronic comparator or by a microprocessor which, for a discrete period of time, is configured by timing and control 27 to accomplish the function at hand, in this case, the comparison of sets of bytes to determine relations among them. In either form, the presence of the proper relationship is indicated by signal H' causing a gating function represented by gate 38 to gate or pass signal S" to computational element 39. Gate 38 may, alternately, be either a discrete electronic gate which passes a signal S" upon the presence of gating signal H', or may be a like functional configuration of a microprocessor during a programmed time to effect the gating function. Upon being gated through, signal S" is supplied to computational element 39.

Computational element 39 provides the system of this invention with one of two final signals, in this instance, a signal F''', necessary for the authorization of the running of the protected program U' portion of program W'. It operates on two signals, the S" signal and a random number signal X', from computer 21 and in accordance with instructions M" from algorithm generator 33. Computational element 39 performs the steps 1-4 as described above for term M, and as a result provides as an output a signal F'''. Computational element 39 may be comprised of discrete devices or be a configured program state, on a time shared basis, of a microprocessor as illustrated as comprising exclusive-OR circuit 39a, multiplier 39b, and divider 39c. In terms of the computational steps outlined for the instruction of term M, exclusive-OR circuit 39a would provide a signal Y", and multiplier 39b would provide a signal Z", counterparts of the terms Y and Z as discussed above. Divider 39c would then provide, as illustrated, the signal F'''.

The generation of signal X' will be discussed below in the description of computer 21.

In summary, there has been described up to this point the generation and encoding of a protected program W' and program key K' into computer 21 and the makeup and functioning of program lock 22 up to the point where it would provide its decoding signal F''' to computer 21. In order to effect a final determination of authorization to run the portion U' of protected program W' in computer 21, computer 21 must operate to generate a like signal to signal F''', a signal F'.

Computer 21 is typically a general purpose computer, but in the present system, it would be sequentially configured, or programmed, particularly as illustrated. It would function under the control of its timing and control 36 to perform the functions illustrated by the labelled blocks of computer 21 as shown in FIG. 2. Alternately, these blocks would be representative of a hardwired device under the control of a timing and control 36, again to function as will be described.

In terms of a general purpose computer, and under the control of timing and control 36, and coordinate with its directions to memory 24 to provide an interrogating signal N' to content addressable memory 35 of program lock 22 as described above and leading to the development of signal F'', memory 24 would have been directed to output a signal R' counterpart of term R, which would direct computer 21 to function for a discrete period as a random number generator, depicted by random number generator block 40, and thereby generate the term X'. In addition to supplying this signal X' to computational element 39 of program lock 22, as described above, this signal is employed in a time shared configured state of computer 21 wherein computer 21 functions as a second computational element 41, which functions to perform the same computational steps as computational element 39, and thus illustrated to comprise exclusive-OR circuit 41a, multiplier 41b, and divider 41c. The intermediate outputs of computational element 41 are labelled as counterparts to computational element 39, and thus the output of exclusive-OR circuit 41a is labelled as Y', and the output of multiplier 41b is labelled as Z'. It is significant as a further feature of the present invention that the immediate sources of signals stemming from terms S and M are different for computational element 41 than for computational element 39, and thus signals S' and M' supplied to computational element 41 are obtained from the program W' stored in memory 24 rather than being obtained via the process described for program lock 22. Assuming that there is identity of terms S' and M' in memory 24 with the counterpart M'' internally generated by program lock 22, and S'' from key K', then the computation from these terms will be, as illustrated, a signal F', which is identical to signal F'' from program lock 22.

The next role of computer 21, and as would be directed by timing and control 36, would be to function as a digital comparator, represented by block 42, to compare the signals F'' and F', and, provided they are identical, to provide an enabling or authorization signal, represented by signal G'. Finally, computer 21 would function under the direction of timing and control 36 as a gating circuit represented by gate 43 and, responsive to the signal G', pass the program U' to a "run" state of computer 21 as represented by user program processor element 44, and by this state, execute program U', adhering completely to its advertised specifications. On the other hand, if signal G' was not asserted, the execution of program U could be aborted or conducted in a manner not advantageous to the user.

Figure 3:
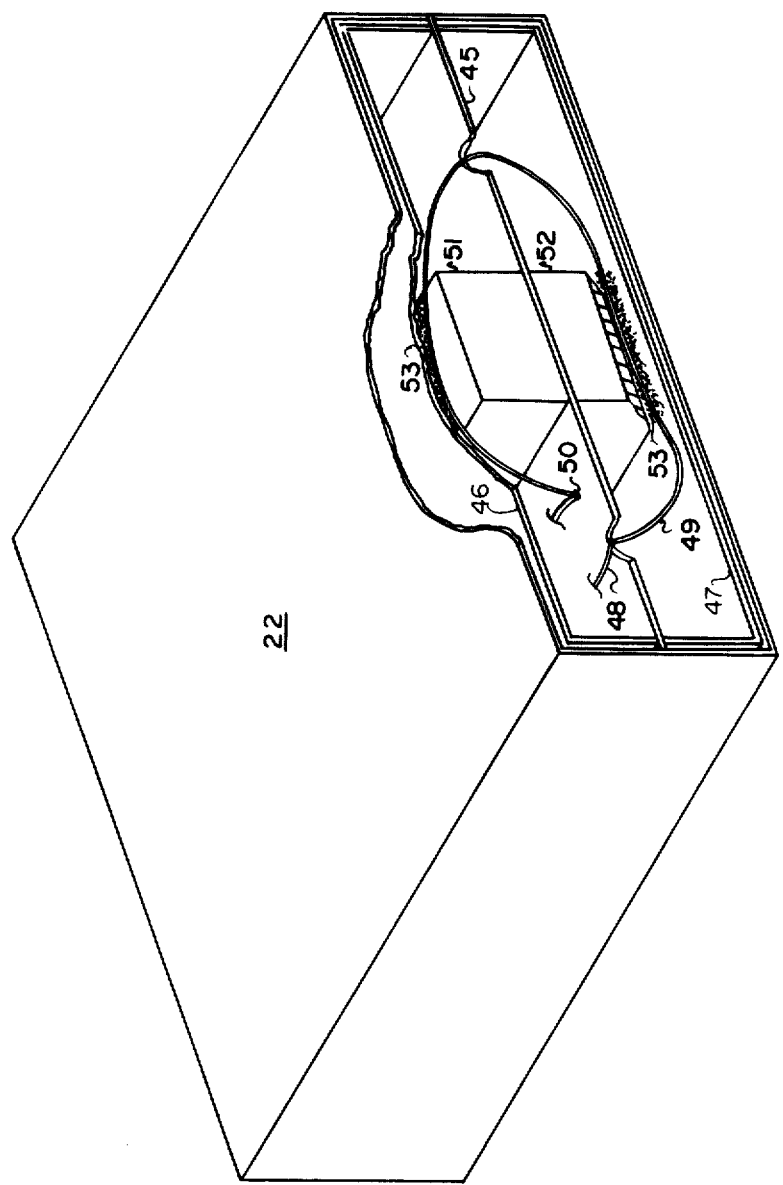
FIG. 3 is a pictorial view, partially cut away, of a structure of the invention and illustrating a security feature of it.

As a final feature of this invention, program lock 22 includes means for particularly protecting from discovery the makeup of signal C', which is representative of the lock identity code C, the security of which is very significant. As stated, signal C' is obtained through signal input 28 and stored in lock identity code memory 30. The operation and retention of the signal in memory 30 is dependent upon power being continuously supplied by battery power supply 29 of program lock 22 which supplies power to some of the circuit elements of program lock 22 by conventional circuitry not shown. Any attempt to access memory 30 to read out lock identity code C is prevented by the system shown in FIG. 3. As shown, circuit board 45, upon which circuit components of program lock 22 are mounted, are enclosed by top and bottom protective plates 46 and 47. Battery power lead 48 is mounted on circuit board 45 and it supplies power through a power lead 49 to circuit component terminal 50, and thus to components by means not shown. Power lead 49 is attached by glue 53 to an inner surface of protective plates 46 and 47. As an aid to the positioning of power lead 49, spacers to which glue will not adhere 51 and 52 are positioned on either side of circuit board 45 and are pressed against conductor 49. Thus, if one attempts to get to any one of the components mounted on printed circuit board 45, including, of course, lock identity code memory 30, at least one of plates 46 and 47 would be significantly moved, and the effect would be to break power lead 49. This would then remove power from some components on circuit board 45, including memory 30. When this occurs, memory 30 would be altered, destroying lock identity code C. In this manner, the system is protected against discovery of the lock identity code C.

From the foregoing, it will be appreciated that in accordance with the system of this invention, an otherwise unprotected software product which may essentially be copied at will is very effectively protected against unauthorized use. As an essential feature, the invention enables a single program lock to effectively protect software products emanating from different owners. At the same time, the invention enables the incorporation of a program lock with a computer in such a manner that it will not interfere with the employment of the computer in the running of programs which are not protected programs in the sense of the present invention.

We claim:

1. A system for limiting reproduction of an electrically representable process comprising:
   process means for storing symbols U representative of a series of operations performable by a plurality of electrical signals U';
   symbol generating and storage means for generating and storing a plurality of test symbols V representative of a go/no-go test and performable by a plurality of signals V';
   storage means responsive to said process means and said symbol generating and storage means for storing a composite W of symbols U and V;
   first translation and memory means for translating said symbols W, stored by said storage means into digitally encoded electrical signals W', including signals U' and V', representative of symbols U and V, respectively, and storing these signals;
   key generating means comprising means responsive to symbols having, in part, a common derivative to that of said test symbols V for generating key symbols K;
   second translation and memory means for translating symbols K, from said key generating means, into electrical signals K' and storing same;
   signal processing means responsive to the receipt of said signals U' for the performance of said series of operations;
   coupling means responsive to a selected input signal for coupling said signals U' from said first translation and memory means to said signal processing means; and
   a process limiting means comprising:
   correlation means including means for effecting a selected correlation between aspects of said signals V', from said first translation and memory means, and signals K', from said second translation and memory means, and for providing a correlation output signal which is a function of said correlation;
   and signal means responsive to a selected output of said correlation means for providing an input signal to said coupling means;

whereby, upon said selected output of said correlation means, the performance of said series of operations is enabled.

2. A system as set forth in claim 1 wherein:

said system includes lock identity code generating means for generating a selected class of electrical identification signals C' representative of identification symbols C;

said symbols to which said key generating means is responsive have a common derivative to that of said identification symbols C;

said process limiting means includes electronic locking means in turn including memory means responsive to said lock identity code generating means for storing said signals C';

said correlation means comprises a portion of said electronic locking means, and includes means further responsive to a selected correlation between signals C' and K' for providing said correlation output signal.

3. A system as set forth in claim 2 wherein:

said key generating means includes means for generating symbols A and B, representative of a selected real time period, and includable in said symbols K;

signals A' and B", representative of said symbols A and B and said selected real time period, are stored via said second translation and memory means;

said electronic locking means includes time generating means for generating signals T" indicative of current time; and said correlation means comprises means responsive to a correlation between the said T" signal, output of said time generating means, and said A" and B" signals, aspects of said signals K', for enabling said correlation output signal of said correlation means.

4. A system as set forth in claim 3 wherein:

said symbol generating and storage means comprises means for generating said storing, as test symbols V, identity symbols S, algorithm symbols R directive of the generation of a random number X, represented by signals X', and algorithm symbols M directive of a selected combination of said symbols S and random number X;

said first translation and memory means comprises means having stored therein, as signals V', electrical signals S', R', and M', representative of symbols S, R, and M, respectively;

said key generating means is responsive to said symbols S, and signals S", representative of said signals S, are includable in said signals K' stored in said second translation and memory means;

said electronic locking means comprises:

discrete, independent signal generating means for generating signals M", representative of said symbols M, and said means for effecting a selected correlation between aspects of said signals V' of said correlation means is responsive to said signals X' as an aspect of said signals R' from said first translation and memory means and signals S" as aspects of said signals K' from said second translation and memory means and said signals M" from said signal generating means for generating a first correlatable output signal F"; and said signal means comprises:

signal combining means responsive to said signals X', S', and M' from said first translation and memory means for providing an intermediate signal output representative of a like response to that effected by said correlation means with respect to signals X', S", and M" for generating a second correlatable output signal F'; and comparator means means responsive to a selected relationship between said correlatable output signals F' and F" for providing said input signal to said coupling means.

5. A system as set forth in claim 4 wherein:

said symbol generating and storage means includes means for generating and storing symbols N as elements of symbols V;

said system includes a digital computer, wjhich in turn includes said first and second translation and memory means, and said first translation and memory means having stored therein electrical signals S', R', N', and M', representative of the symbols S, R, N, and M, respectively;

said key generating means is responsive to said symbols N and S, and signals N" and S", representative of signals N and S, are included in said signals K' stored in said second translation and memory means; and said correlation means comprising a portion of said electronic locking means is additionally responsive to a selected correlation of said signals N', as aspects of said signals V' from said first translation and memory means, and signals N" as aspects of said signals K' from said second translation and memory means for enabling the generation of said correlation output signal.

6. A system as set forth in claim 5 wherein:

said lock identity code generating means includes means responsive to discrete symbols P and Q for generating signals C';

said key generating means comprises means responsive to signals representative of said symbols P and Q for generating said symbols K and thereby signals K';

said key generating means is further responsive to signals representative of discrete symbols D for the generation of symbols K and thereby signals K';

said electronic locking means includes discrete, independent means for generating signals D' representative of symbols D; and said correlation means comprising a portion of said electronic locking means is futher responsive to a selected correlation between said signals D' and said signals C' for providing said correlation output signal.

7. A system as set forth in claim 2 wherein:

said electronic locking means includes a container means for enclosing at least said memory means, and electrical control means coupled to said container means and said memory means for altering said signal C' upon an entry into said container.

8. A system as set forth in claim 7 wherein said electrical control means includes bias means for supplying an operating bias to said memory means, and including means responsive to entry into said container means for interrupting said bias and thereby altering said signal C'.

9. A system as set forth in claim 4 wherein:

said correlation means comprises:

first conversion means for complementing bits of a first group of selected bytes of signals S", in instances where corresponding bits of signal X' are set, to provide a signal Y", first multiplication means responsive to said signals S" and Y" for multiplying signal Y" by a second group of selected bytes of signal S" to provide a signal Z", and first division means responsive to said signals S" and Z" for dividing signal Z" by a third group of selected bytes of signal S", and for providing as an output a signal representative of the remainder from the division, and being said first correlatable output signal F";

said signal means comprises:

second conversion means for complementing bits of a first group of selected bytes of signals S', in instances where corresponding bits of X', as per the selection of said first conversion means with respect to signals S", are set, to provide a signal Y', second multiplication means responsive to said signals S' and Y' for multiplying signals Y' by a like second group of selected bytes of selected signals S' to the order of selection of said second group with respect to said signal S" by said first multiplication means to provide a signal Z', and second division means responsive to said signals S' and Z' for dividing signals Z' by a like third group of selected bytes of signal S' to that provided said first division means with respect to signal S", and for providing a signal representative of the remainder of said last-named division, and being said second correlatable output signal F'.

* * * * *